US012438415B2

(12) United States Patent
Suzuki et al.

(10) Patent No.: US 12,438,415 B2
(45) Date of Patent: Oct. 7, 2025

(54) TRANSMISSION-EQUIPPED MOTOR

(71) Applicant: KYB Corporation, Tokyo (JP)

(72) Inventors: Kenji Suzuki, Kanagawa (JP); Keita Matsuzaka, Kanagawa (JP); Jun Suzuki, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 173 days.

(21) Appl. No.: 18/002,727

(22) PCT Filed: Jun. 18, 2021

(86) PCT No.: PCT/JP2021/023164
§ 371 (c)(1),
(2) Date: Dec. 21, 2022

(87) PCT Pub. No.: WO2022/014256
PCT Pub. Date: Jan. 20, 2022

(65) Prior Publication Data
US 2023/0246519 A1   Aug. 3, 2023

(30) Foreign Application Priority Data

Jul. 14, 2020 (JP) ................................ 2020-120765

(51) Int. Cl.
*F16D 1/02* (2006.01)
*F16H 1/46* (2006.01)
*H02K 7/116* (2006.01)

(52) U.S. Cl.
CPC .............. *H02K 7/116* (2013.01); *F16D 1/02* (2013.01); *F16H 1/46* (2013.01)

(58) Field of Classification Search
CPC ...... F16H 1/28; F16D 1/00; F16D 1/02; F16D 1/033; F16D 1/04; H02K 7/116
See application file for complete search history.

(56) References Cited

U.S. PATENT DOCUMENTS

| 4,124,318 | A | * | 11/1978 | Sagady | ................ | F16D 3/226 |
| | | | | | | 403/14 |
| 4,417,485 | A | * | 11/1983 | Boor | ..................... | F16H 1/46 |
| | | | | | | 475/330 |
| 5,536,101 | A | * | 7/1996 | Schwarzler | ......... | F16D 1/116 |
| | | | | | | 403/359.5 |
| 6,390,925 | B1 | * | 5/2002 | Perrow | ............... | F16D 3/2055 |
| | | | | | | 464/111 |

(Continued)

FOREIGN PATENT DOCUMENTS

| CN | 1664416 A | 9/2005 | | |
| DE | 19746394 A1 | * 4/1999 | ........... | B66D 1/14 |

(Continued)

OTHER PUBLICATIONS

JP2019158112 Nagae et al., English Abstract (Year: 2019).*

*Primary Examiner* — Burton S Mullins
(74) *Attorney, Agent, or Firm* — Rabin & Berdo, P.C.

(57) ABSTRACT

In a transmission-equipped motor, a spline portion is formed at an end portion of a drive shaft of a transmission, and a spline hole with which the spline portion is engaged is formed on an end surface of a motor shaft of a hydraulic motor. A snap ring which contacts an end surface of the motor shaft having the spline hole is provided on an outer periphery of the drive shaft having the spline portion so that the snap ring positions the motor shaft and the drive shaft.

5 Claims, 3 Drawing Sheets

(56) References Cited

U.S. PATENT DOCUMENTS

| | | | | |
|---|---|---|---|---|
| 6,952,061 B2* | 10/2005 | Mogi | ................... | H02K 5/24 |
| | | | | 310/90 |
| 8,870,489 B2* | 10/2014 | Langer | ................ | F16D 1/116 |
| | | | | 403/317 |
| 10,274,049 B2* | 4/2019 | Shinohara | ............... | F16C 17/10 |
| 10,443,657 B2* | 10/2019 | Nakawatari | ........... | F16D 1/0835 |
| 11,060,563 B2* | 7/2021 | Fabian | ................ | F16D 1/108 |
| 2009/0285517 A1* | 11/2009 | Eckel | ................... | H02K 7/083 |
| | | | | 384/513 |
| 2020/0340570 A1* | 10/2020 | Kuwamoto | ......... | F16H 57/0037 |

FOREIGN PATENT DOCUMENTS

| | | | | | |
|---|---|---|---|---|---|
| DE | 102015213731 | A1 | | 1/2017 | |
| EP | 3731381 | A1 | * | 10/2020 | ............ F16H 55/06 |
| JP | H0436147 | U1 | | 3/1992 | |
| JP | H07-028440 | Y2 | | 6/1995 | |
| JP | 2020024016 | A | * | 2/2000 | ............... F16H 1/46 |
| JP | 2006096269 | | * | 4/2006 | ............ B60B 35/14 |
| JP | 2017032083 | A | * | 2/2017 | ............... F16D 1/02 |
| JP | 2017053394 | | * | 3/2017 | ............... F16D 1/02 |
| JP | 6233324 | B2 | * | 11/2017 | ............... B60K 6/40 |
| JP | 2019158112 | A | * | 9/2019 | ............ F16H 41/24 |
| WO | WO2016/11186 | | * | 7/2016 | ............ B60K 6/36 |
| WO | WO-2016111186 | A1 | * | 7/2016 | ............... B60K 6/40 |

* cited by examiner

TRANSMISSION-EQUIPPED MOTOR

TECHNICAL FIELD

The present invention relates to a transmission-equipped motor.

BACKGROUND ART

JP1995-28440Y discloses a motor with speed reducer including a planetary gear mechanism provided on an output side of a hydraulic motor. In this motor with speed reducer, an input shaft, which is an input side member of a speed reducer assembly including a planetary speed reduction mechanism, is connected to a motor shaft of the hydraulic motor.

SUMMARY OF INVENTION

In the motor with speed reducer described in JP1995-28440Y, the input shaft of the planetary speed reduction mechanism is inserted into a recess formed in an end surface of the motor shaft of the hydraulic motor and connected to the motor shaft of the hydraulic motor. As the tip end surface of the input shaft of the speed reduction mechanism contacts the bottom surface of the recess of the motor shaft of the hydraulic motor, the input shaft of the speed reduction mechanism and the motor shaft of the hydraulic motor are positioned in the axial direction.

In such a configuration, to ensure the positioning accuracy of the input shaft of the speed reduction mechanism and the motor shaft of the hydraulic motor, it is necessary to accurately machine the tip end surface of the input shaft of the speed reduction mechanism and the bottom surface of the recess formed in the motor shaft of the hydraulic motor, which are in contact with each other, into flat surfaces. However, in general, the machining of the bottom surface of the recess is complicated because it is necessary to insert a tool into the recess to perform machining, etc., and the machining may lead to an increase in manufacturing cost.

The object of the present invention is to reduce the manufacturing cost of the transmission-equipped motor.

DESCRIPTION OF EMBODIMENTS

Hereinafter, a transmission-equipped motor 100 according to the embodiment of the present invention will be described with reference to the drawings.

The transmission-equipped motor 100 is, for example, used as a traveling motor that is provided in an axle portion of a crawler working machine such as a hydraulic shovel to drive a crawler belt.

Figure 1:
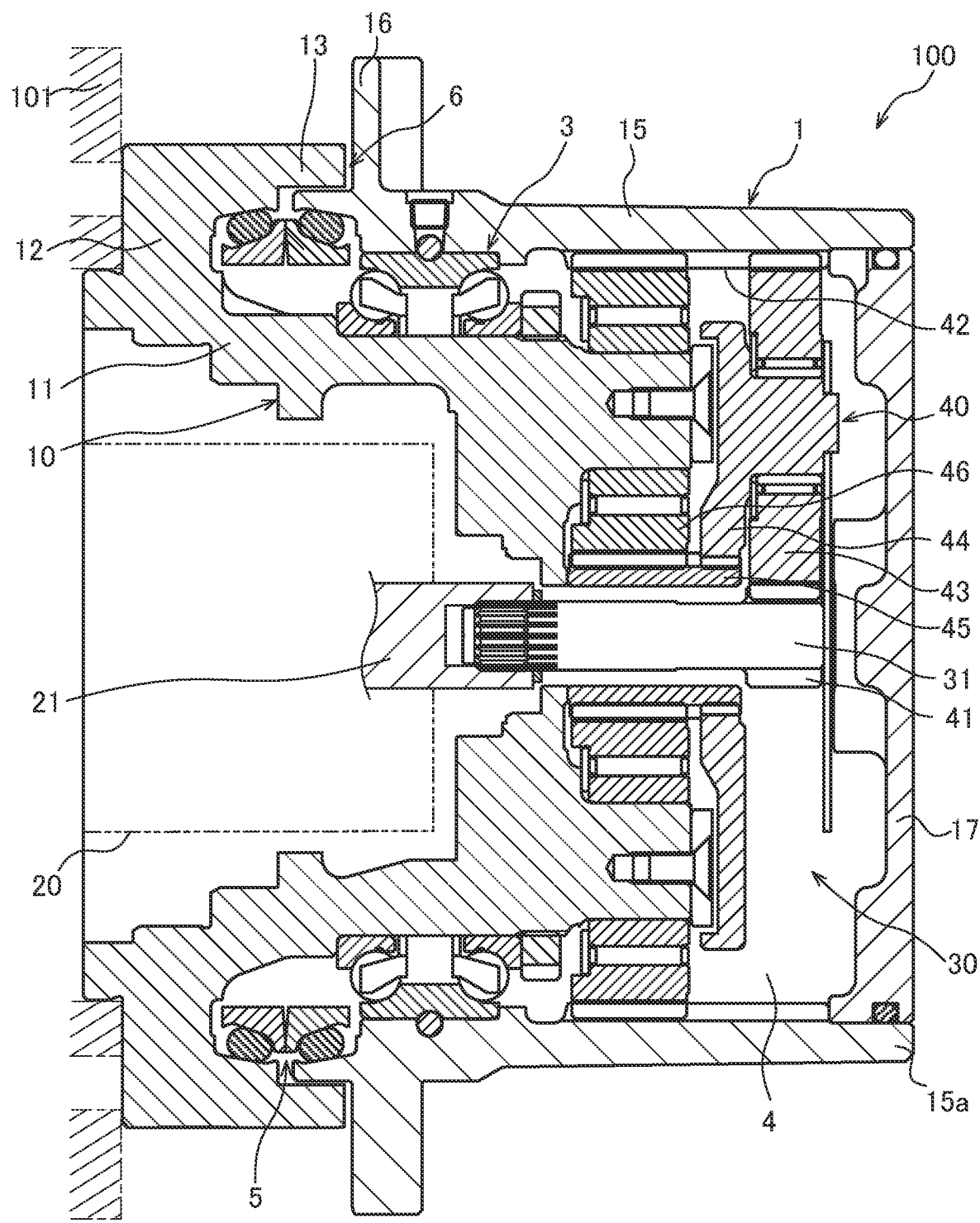
FIG. 1 is a cross-sectional view of a hydraulic transmission-equipped motor according to an embodiment of the present invention.

As shown in FIG. 1, the transmission-equipped motor 100 includes a housing 1, a hydraulic motor 20 (motor) as a driving source, and a transmission 30 that shifts the output rotation of a motor shaft 21 of a hydraulic motor 20.

The housing 1 includes a fixed housing 10 and a cylindrical rotating housing 15 that rotates with respect to the fixed housing 10. A sprocket (not illustrated) is connected to an outer peripheral surface of the rotating housing 15. As the rotating housing 15 and the sprocket rotate together, the crawler belt (not illustrated) that meshes with the sprocket circulates and the vehicle travels.

The fixed housing 10 and rotating housing 15 are arranged inside the path through which the crawler belt circulates. The rotating housing 15 is rotatably supported via a bearing 3 with respect to the fixed housing 10 connected to a vehicle body 101 which is an external member, and rotates around the central axis of the fixed housing 10.

The fixed housing 10 has a fixed flange portion 12 that is formed protruding from an outer peripheral surface of a main body portion 11 and mounted to the vehicle body 101.

A disk-shaped opening end cover 17 that closes an opening end 15a of the rotating housing 15 is detachably mounted to the inner periphery of the opening end 15a.

The inner surface of the rotating housing 15, the outer surface of the main body portion 11 of the fixed housing 10, and the opening end cover 17 define a gear chamber 4 that houses a transmission mechanism 40 to be described below. The gear chamber 4 is filled with a lubricating oil that lubricates the transmission mechanism 40.

The rotating housing 15 is formed with an annular rotational flange portion 16 protruding from the outer peripheral surface. The sprocket described above is fastened to the rotational flange portion 16 by a plurality of bolts (not illustrated) and rotates together with the rotating housing 15.

A floating seal 5 is provided between the fixed housing 10 and the rotating housing 15. The floating seal 5 seals the hydraulic oil in the transmission 30 so that it does not leak to the outside when the rotating housing 15 is rotated, and also prevents foreign materials from entering the transmission 30 from the outside.

Further, between the fixed housing 10 and the rotating housing 15, a labyrinth seal 6 is formed on the outside of the floating seal 5 to prevent foreign materials such as mud from entering from the outside. The labyrinth seal 6 is formed by the gap between the mutually opposing end surfaces of the fixed housing 10 and the rotating housing 15.

The hydraulic motor 20 is provided inside the main body portion 11 of the fixed housing 10. The hydraulic motor 20 is, for example, a swash plate type piston motor in which the motor shaft 21 is rotationally driven by the supply and discharge of hydraulic oil (hydraulic fluid). Further, the motor may be other than the hydraulic motor 20 (hydraulic motor), and for example, an electric motor or the like may be used. The hydraulic motor 20 can adopt a known configuration, and thus, the hydraulic motor 20 is illustrated in a simplified manner except for the motor shaft 21 in FIG. 1, and the detailed description thereof is omitted in the present description.

The transmission 30 includes a drive shaft 31, which is coaxially connected to the motor shaft 21 of the hydraulic motor 20 and transmits the rotation of the motor shaft 21, and the transmission mechanism 40, which is housed inside the rotating housing 15 and shifts the drive shaft 31.

The transmission mechanism 40 is a planetary gear mechanism. The transmission mechanism 40 includes: a sun gear 41 provided on the drive shaft 31; an inner gear 42 provided on the inner wall of the rotating housing 15; a plurality of planetary gears 43 that mesh with both the sun gear 41 and the inner gear 42; a planetary carrier 44 that supports each planetary gear 43; a second-stage sun gear 45 that meshes with the planetary carrier 44; and a plurality of planetary gears 46 that mesh with both the sun gear 45 and the inner gear 42. The transmission mechanism 40 shifts (changes speed of) the output rotation of the motor shaft 21 of the hydraulic motor 20 transmitted through the drive shaft 31 and transmits the output rotation to the rotating housing 15.

Next, with reference to FIG. 2, the connection structure between the motor shaft 21 of the hydraulic motor 20 and the drive shaft 31 of the transmission 30 will be described.

The motor shaft 21 and the drive shaft 31 are coaxially connected to each other by spline coupling. Thereby, when the motor shaft 21 of the hydraulic motor 20 is rotationally driven, the drive shaft 31 also rotates with the rotation of the motor shaft 21. Further, the coupling between the motor shaft 21 and the drive shaft 31 is not limited to spline coupling, and may be any configuration as long as the drive shaft 31 is configured to rotate with the rotation of the motor shaft 21.

Figure 2:
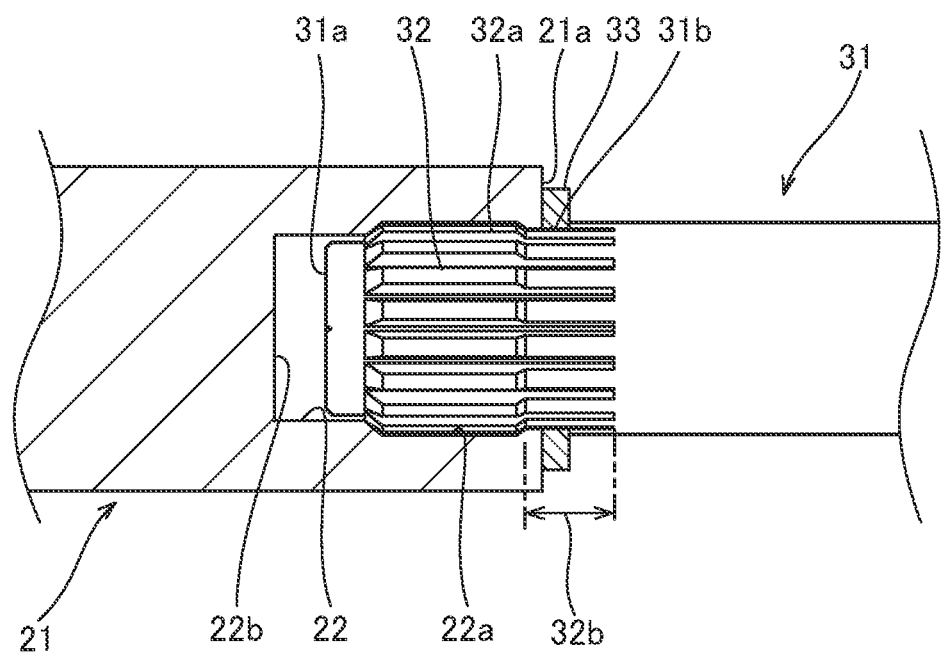
FIG. 2 is a cross-sectional view showing a connection structure between a motor shaft of a motor and a drive shaft of a transmission according to the embodiment of the present invention.

As shown in FIG. 2, the end portion of the drive shaft 31 on the side of the hydraulic motor 20 is provided with a spline portion 32 as an engaging portion in which spline teeth 32a are formed on an outer periphery. Further, the end surface of the end portion of the drive shaft 31 on the side of the hydraulic motor 20 (hereinafter also referred to as "tip end surface 31a") is formed as a flat surface perpendicular to the central axis of the drive shaft 31. The tip end surface 31a of the drive shaft 31 is a surface facing the motor shaft 21 (opposing surface).

A spline hole 22 serving as an engaging recess in which spline grooves 22a are formed on an inner periphery is formed on an end surface of the motor shaft 21 on the side of the drive shaft 31 (hereinafter also referred to as "tip end surface 21a"). The end portion of the drive shaft 31 is inserted into the spline hole 22. The spline hole 22 is a circular hole having a bottom surface 22b. The tip end surface 21a of the motor shaft 21 and the bottom surface 22b of the spline hole 22 are flat surfaces perpendicular to the motor shaft 21. Further, the tip end surface 21a is a surface (opposing surface) facing the drive shaft 31.

The drive shaft 31 and the motor shaft 21 are connected by engaging (spline coupling) the spline portion 32 of the drive shaft 31 with the spline hole 22 of the motor shaft 21.

An annular mounting groove 31b is formed on an outer periphery of the drive shaft 31, specifically, on an outer periphery of an incomplete structure 32b in the spline portion 32. The mounting groove 31b is provided with a snap ring 33 as an annular contact portion protruding outward in the radial direction of the drive shaft 31. The snap ring 33 is detachably mounted to the mounting groove 31b of the drive shaft 31. Further, the incomplete structure 32b (incomplete spline portion) of the spline portion 32 is a part which is formed by processing the spline teeth 32a and does not function as a spline, and is the part corresponding to the boundary portion between the spline teeth 32a and the part where the spline teeth 32a are not formed. FIG. 2 illustrates the incomplete structure 32b schematically by two-dot chain lines and arrows.

An outer diameter of the snap ring 33 is set to be larger than an inner diameter of the spline hole 22 of the motor shaft 21 and smaller than an outer diameter of the end portion of the motor shaft 21 in a state of being mounted on the outer periphery of the drive shaft 31. Further, the outer diameter of the snap ring 33 is formed to be smaller than an inner diameter of the sun gear 45 (see FIG. 1) in the state of being mounted on the outer periphery of the drive shaft 31. According to this, the drive shaft 31 can be inserted into an inner periphery of the sun gear 45 even in a state when the snap ring 33 is mounted, and thus, the assemblability of the transmission 30 is improved.

The spline portion 32 of the drive shaft 31 is inserted into the spline hole 22 of the motor shaft 21 until the snap ring 33 contacts the tip end surface 21a of the motor shaft 21. In this way, as the snap ring 33 contacts the tip end surface 21a of the motor shaft 21, the drive shaft 31 and the motor shaft 21 are positioned in the axial direction. By positioning the drive shaft 31 and motor shaft 21 in the axial direction with the snap ring 33, a coupling length of spline coupling is ensured, and the occurrence of stress concentration due to insufficient coupling length is prevented to ensure durability.

In the state when the snap ring 33 is in contact with the tip end surface 21a of the motor shaft 21, the tip end surface 31a of the drive shaft 31 and the bottom surface 22b of the spline hole 22 of the motor shaft 21 do not contact each other and are separated in the axial direction (the left-right direction in FIG. 2) of the motor shaft 21 (drive shaft 31). Therefore, a gap is formed between the tip end surface 31a of the drive shaft 31 and the bottom surface 22b of the spline hole 22.

Here, in order to position the drive shaft and the motor shaft in the axial direction, it is also conceivable to bring the tip end surface of the drive shaft inserted into the spline hole and the bottom surface of the spline hole into contact with each other without providing the snap ring. In this case, in order to ensure the positioning accuracy, it is necessary to machine (perform a finishing process on) each of the tip end surface of the drive shaft and the bottom surface of the spline hole with high accuracy and flatness. However, machining the bottom surface of the spline hole is complicated because it is necessary to insert a tool into the spline hole for the machining, etc. In addition, for example, as compared with machining the outer periphery of the motor shaft or machining the spline grooves of the spline hole, machining the bottom surface of the spline hole requires changing the setup such as changing the tool or changing (re-chucking) the mounting posture of the workpiece (motor shaft) in the machine tool, and it may be hard to perform the machining continuously without a setup change. Thus, machining the bottom surface of the spline hole may increase the manufacturing steps and increase the manufacturing cost of the transmission-equipped motor.

On the other hand, in this embodiment, as the snap ring 33 provided on the outer periphery of the drive shaft 31 contacts the tip end surface 21a of the motor shaft 21, the drive shaft 31 and the motor shaft 21 are positioned. Therefore, the tip end surface 31a of the drive shaft 31 and the bottom surface 22b of the spline hole 22 of the motor shaft 21 are separated from each other without contacting each other. This eliminates the requirement of a finishing process that machines the bottom surface 22b of the spline hole 22 into a flat surface. In addition, the machining of the snap ring 33 and the machining of the tip end surface 21a of the motor shaft 21 can be performed more easily than the machining of the bottom surface 22b of the spline hole 22. Therefore, in this embodiment, the manufacturing process of the transmission-equipped motor 100 can be simplified.

According to the above embodiment, the following actions and effects are exhibited.

In the transmission-equipped motor 100, the motor shaft 21 of the hydraulic motor 20 and the drive shaft 31 of the transmission 30 are positioned as the snap ring 33 provided on the outer periphery of the drive shaft 31 contacts the tip end surface 21*a* of the motor shaft 21. Thereby, it is not necessary to bring the bottom surface 22*b* of the spline hole 22 formed in the motor shaft 21 into contact with the tip end surface 31*a* of the drive shaft 31 for positioning the motor shaft 21 and the drive shaft 31. Therefore, it is possible to omit the finishing process, which is for ensuring the accuracy, on the bottom surface 22*b* of the spline hole 22. Thus, the manufacturing cost of the transmission-equipped motor 100 can be reduced.

Further, the finishing process on the bottom surface 22*b* of the spline hole 22 can be omitted, and it is not necessary to perform the finishing process on the tip end surface 31*a* of the drive shaft 31 accordingly. Therefore, the spline hole 22 or the end portion of the drive shaft 31 including the spline portion 32 can be formed by plastic working such as forging instead of machining. Thereby, the material yield can be improved and the manufacturing cost of the transmission-equipped motor 100 can be further suppressed. Further, the drive shaft 31 may be machined.

Further, the snap ring 33 is provided on the outer periphery of the incomplete structure 32*b* of the spline portion 32 of the drive shaft 31. Thereby, comparing with the case when the snap ring 33 is provided on the outer periphery of the portion of the drive shaft 31 where the spline portion 32 is not formed, the transmission-equipped motor 100 can be miniaturized in the axial direction of the motor shaft 21. In addition, because the snap ring 33 is provided on the incomplete structure 32*b* that does not function as a spline (does not engage with the spline grooves 22*a*), the axial area occupied by the incomplete structure 32*b* can be effectively utilized, and the transmission-equipped motor 100 can be miniaturized in the axial direction while ensuring the coupling length of spline coupling. Further, by providing the snap ring 33 on the incomplete structure 32*b*, it is possible to prevent the spline grooves 22*a* on the inner periphery of the spline hole 22 from engaging with the incomplete structure 32*b*.

Next, modifications of this embodiment will be described. The following modifications are also within the scope of the present invention, and it is possible to combine a configuration shown in the modifications with the configuration described in the aforementioned embodiment, or to combine the configurations described in the different modifications below.

In the above embodiment, the snap ring 33 is provided on the outer periphery of the incomplete structure 32*b* of the spline portion 32, but this configuration is not essential. The snap ring 33 may be provided at a position away from the spline portion 32 toward the opposite side to the motor shaft 21. Further, when the engagement length between the spline portion 32 and the spline hole 22 can be sufficiently ensured, the snap ring 33 may be provided on the outer periphery of the spline portion 32. Further, if the snap ring 33 is provided at a position away from the spline portion 32 toward the opposite side to the motor shaft 21, it is necessary to lengthen the motor shaft 21 or the drive shaft 31 according to the position. Therefore, in order to miniaturize the transmission-equipped motor 100 in the axial direction, it is desirable to provide the snap ring 33 at a position close to the spline portion 32, and by providing the snap ring 33 on the outer periphery of the incomplete structure 32*b* as described above, it is possible to realize further miniaturization in the axial direction.

Figure 3:
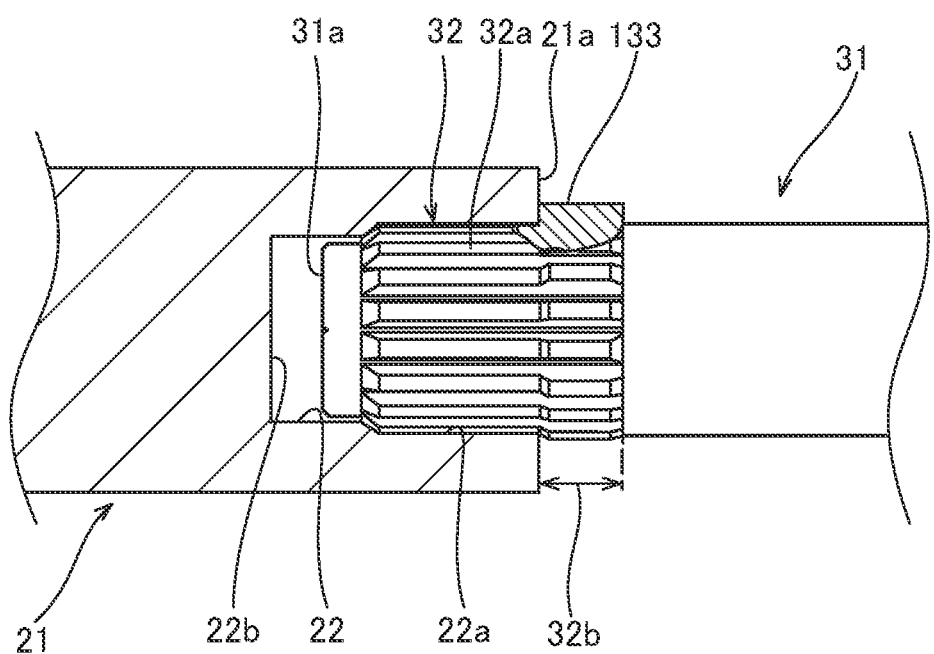
FIG. 3 is a cross-sectional view showing a connection structure between a motor shaft of a motor and a drive shaft of a transmission according to a modification of the embodiment of the present invention.

Further, in the above embodiment, the contact portion is the snap ring 33 detachably provided on the outer periphery of the drive shaft 31. That is, in the above embodiment, the contact portion is configured as a separate body from the drive shaft 31. On the other hand, as shown in FIG. 3, the contact portion may be an annular protrusion 133 that is integrally formed with the drive shaft 31 and projects radially outward from the outer periphery of the drive shaft 31. According to such a modification, there is no risk of forgetting to mount the snap ring, and thus, the contact portion can be more reliably brought into contact with the motor shaft 21 of the hydraulic motor 20. Even when the contact portion is the protrusion 133, it is desirable that the protrusion 133 is provided at the position corresponding to the incomplete structure 32*b* of the spline portion 32, but not limited to this, the projection 133 may be provided on the spline portion 32 or in a region where the spline portion 32 is not provided on the drive shaft 31.

Further, in the above embodiment, the spline portion 32 is formed on the drive shaft 31 of the transmission 30, and the spline hole 22 is formed on the motor shaft 21 of the hydraulic motor 20. That is, the drive shaft 31 is configured as a male spline and the motor shaft 21 is configured as a female spline. On the other hand, the configuration of spline coupling may be the opposite of that of the above embodiment. That is, the spline portion 32 as the engaging portion may be formed on the motor shaft 21 of the hydraulic motor 20, and the spline hole 22 as the engaging recess may be formed on the tip end surface 31*a* of the drive shaft 31 of the transmission 30. In this case, the motor shaft 21 and the drive shaft 31 may be positioned by providing a contact portion (snap ring 33, protrusion 133) on the motor shaft 21 on which the engaging portion is formed and bringing the contact portion and the tip end surface 31*a* of the drive shaft 31 into contact with each other. This modification also exhibits the same actions and effects as those of the above embodiment.

Further, in the above embodiment, the transmission mechanism 40 is a planetary gear mechanism, but the transmission mechanism 40 is not limited thereto. The transmission mechanism 40 may be another gear mechanism or may be configured by combining a plurality of gear mechanisms.

Hereinafter, the configurations, actions, and effects of the embodiment of the present invention will be collectively described.

The transmission-equipped motor 100 includes: the hydraulic motor 20 in which the motor shaft 21 is rotationally driven; and the transmission 30 that has the drive shaft 31 connected to the motor shaft 21 and shifts and outputs the rotation of the motor shaft 21 transmitted through the drive shaft 31, wherein: one of the motor shaft 21 of the hydraulic motor 20 and the drive shaft 31 of the transmission 30 has the engaging portion (spline portion 32) formed at the end portion; the other of the motor shaft 21 of the hydraulic motor 20 and the drive shaft 31 of the transmission 30 has the engaging recess (spline hole 22) with which the engaging portion is engaged formed on the end surface thereof; and on the outer periphery of the one of the motor shaft 21 and the drive shaft 31 where the engaging portion is formed, there is provided a contact portion (snap ring 33, protrusion 133) which contacts the end surface 21*a* of the other of the motor shaft 21 and the drive shaft 31 where the engaging recess is formed to position the motor shaft 21 and the drive shaft 31.

Further, in the transmission-equipped motor 100, the contact portion is the snap ring 33 detachably mounted to the outer periphery of one of the motor shaft 21 and the drive shaft 31.

In these configurations, the motor shaft 21 of the hydraulic motor 20 and the drive shaft 31 of the transmission 30 are positioned as the contact portion provided on the outer periphery of one of the motor shaft 21 and the drive shaft 31 contacts the end surface of the other of the motor shaft 21 and the drive shaft 31. Thereby, it is not necessary to bring the bottom surface 22b of the engaging recess formed on the other of the motor shaft 21 and the drive shaft 31 into contact with the one of the motor shaft 21 and the drive shaft 31 for positioning. Therefore, it is possible to omit the machining on the bottom surface 22b of the engaging recess for ensuring accuracy. Thus, the manufacturing cost of the transmission-equipped motor 100 can be reduced.

Further, in the transmission-equipped motor 100 according to the modification, the contact portion is the protrusion 133 that is integrally formed with the drive shaft 31 and projects radially outward from the outer periphery of the drive shaft 31.

In this configuration, there is no risk of forgetting to mount the contact portion to the drive shaft 31, and thus, the contact between the motor shaft 21 and the contact portion (protrusion 133) can be achieved more reliably.

Further, in the transmission-equipped motor 100, the engaging portion is the spline portion 32 formed on the outer periphery of one of the motor shaft 21 and the drive shaft 31, and the contact portion is provided on the outer periphery of the incomplete structure 32b of the spline portion 32.

In this configuration, the transmission-equipped motor 100 can be miniaturized in the axial direction of the motor shaft 21 while ensuring the bond length of the spline coupling.

The embodiments of the present invention described above are merely illustration of some application examples of the present invention and the technical scope of the present invention is not limited to the specific constructions of the above embodiments.

The invention claimed is:

1. A transmission-equipped motor, comprising:
a motor having a motor shaft which is rotationally driven; and
a transmission having a drive shaft connected to the motor shaft, the transmission being configured to shift and output the rotation of the motor shaft transmitted through the drive shaft, wherein:
one of the motor shaft of the motor and the drive shaft of the transmission has an engaging portion formed at an end portion thereof, and the other of the motor shaft of the motor and the drive shaft of the transmission has an engaging recess formed on an end surface thereof and engaged with the engaging portion;
the engaging portion is a spline portion formed on the outer periphery of the one of the motor shaft and the drive shaft; and
a contact portion is provided on an outer periphery of an incomplete spline portion of the spline portion, the contact portion being in contact with the end surface of the other of the motor shaft and the drive shaft on which the engaging recess is formed to position the motor shaft and the drive shaft.

2. A transmission-equipped motor, comprising:
a motor having a motor shaft which is rotationally driven; and
a transmission having a drive shaft connected to the motor shaft, the transmission being configured to shift and output the rotation of the motor shaft transmitted through the drive shaft, wherein
one of the motor shaft of the motor and the drive shaft of the transmission has an engaging portion formed at an end portion thereof, and the other of the motor shaft of the motor and the drive shaft of the transmission has an engaging recess formed on an end surface thereof and engaged with the engaging portion;
a contact portion is provided on an outer periphery of the one of the motor shaft and the drive shaft on which the engaging portion is formed, the contact portion being in contact with the end surface of the other of the motor shaft and the drive shaft on which the engaging recess is formed to position the motor shaft and the drive shaft;
the contact portion is a snap ring detachably mounted to the outer periphery of the one of the motor shaft and the drive shaft;
the engaging portion is a spline portion formed on the outer periphery of the one of the motor shaft and the drive shaft; and
the contact portion is provided on the outer periphery of an incomplete spline portion of the spline portion.

3. A transmission-equipped motor, comprising:
a motor having a motor shaft which is rotationally driven; and
a transmission having a drive shaft connected to the motor shaft, the transmission being configured to shift and output the rotation of the motor shaft transmitted through the drive shaft, wherein:
one of the motor shaft of the motor and the drive shaft of the transmission has an engaging portion formed at an end portion thereof, and the other of the motor shaft of the motor and the drive shaft of the transmission has an engaging recess formed on an end surface thereof and engaged with the engaging portion;
a contact portion is provided on an outer periphery of the one of the motor shaft and the drive shaft on which the engaging portion is formed, the contact portion being in contact with the end surface of the other of the motor shaft and the drive shaft on which the engaging recess is formed to position the motor shaft and the drive shaft;
the contact portion is a protrusion that is integrally formed with the one of the motor shaft and the drive shaft and projects radially outward from the outer periphery of the one of the motor shaft and the drive shaft;
the engaging portion is a spline portion formed on the outer periphery of the one of the motor shaft and the drive shaft; and
the contact portion is provided on the outer periphery of an incomplete spline portion of the spline portion.

4. The transmission-equipped motor according to claim 1, wherein the contact portion is in contact with the end surface of the other of the motor shaft and the drive shaft, so as to be outside the other of the motor shaft and the drive shaft.

5. The transmission-equipped motor according to claim 2, further comprising a sun gear mounted on an outer periphery of the drive shaft, wherein an outer diameter of the snap ring is smaller than an inner diameter of the sun gear.

* * * * *